(12) United States Patent
Murakami

(10) Patent No.: US 6,909,618 B2
(45) Date of Patent: Jun. 21, 2005

(54) SWITCHING POWER SUPPLY

(75) Inventor: Kohzaburoh Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/701,564

(22) Filed: Nov. 6, 2003

(65) Prior Publication Data

US 2004/0109334 A1 Jun. 10, 2004

(30) Foreign Application Priority Data

Dec. 9, 2002 (JP) ........................................ 2002-357039

(51) Int. Cl.[7] .............................................. H02M 1/00
(52) U.S. Cl. ........................................ 363/49; 323/901
(58) Field of Search ............................. 363/15, 16, 18, 363/19, 49, 97; 323/901

(56) References Cited

U.S. PATENT DOCUMENTS 6,178,100 B1 * 1/2001 Kitano ........................ 393/19
6,483,725 B2 * 11/2002 Schetters et al. ............. 363/19

FOREIGN PATENT DOCUMENTS

| JP | 11-46480 A | 2/1999 |
| JP | 2000-333448 A | 11/2000 |

* cited by examiner

Primary Examiner—Gary L. Laxton
(74) Attorney, Agent, or Firm—Birch, Stewart, Kolasch & Birch, LLP

(57) ABSTRACT

In relation to a starting circuit for supplying a DC supply voltage to the gate of a main switching device at a power-on to start a switching operation, a holding circuit for holding a starting voltage obtained in the starting circuit is provided. The potential at the gate of the main switching device is increased immediately from a turn-off to turn on the main switching device repeatedly, realizing a smooth transition to the steady oscillation state. This allows the switching power supply to readily start even under the condition of a low supply voltage and a heavy load. This makes it possible to improve the starting characteristic and to allow for lower power consumption.

12 Claims, 9 Drawing Sheets

Vs: VOLTAGE INDUCED IN SECONDARY WINDING N2
L2: INDUCTANCE OF SECONDARY WINDING N2

SWITCHING POWER SUPPLY

FIELD OF THE INVENTION

The present invention relates to a switching power supply of the so-called ringing choke converter (RCC) type.

BACKGROUND OF THE INVENTION

The RCC is an inverter repeating the operation in which a stored energy in a coil is released to generate voltage-oscillating energy, and the generated voltage-oscillating energy is rectified to supply it to the load.

A switching power supply of the RCC type stores excited energy inside a transformer during a turn-on period of a main switching device and charges a capacitor by a current obtained from a voltage induced in a control winding of the transformer and a feedback current supplied from the secondary side. Then, when a charged voltage reaches a predetermined voltage, a control switching device turns off a control terminal of the main switching device. During the turn-off period, the excited energy stored inside the transformer is outputted to the secondary side. After all the excited energy is outputted, a ringing pulse which generates in a control winding of the transformer is fed back to the control terminal of the main switching device to turn on the main switching device again, thereby carrying out steady oscillation.

The heavier the load is, the turn-off period and the turn-on period become longer automatically. That is, since a switching frequency drops, an output voltage on the secondary side can be maintained to a predetermined constant voltage. This eliminates the need for such an intricate control circuit as that in a switching power supply of the pulse width modulation (PWM) type and the need for a power supply circuit for operating the control circuit and generating a voltage that will be a reference voltage for a pulse width. Therefore, the power supply of the RCC type, which is preferable in terms of cost reduction, has been widely used.

Note that, as prior art related to a switching power supply of the RCC type, there exists Japanese Laid-Open Patent Application No. 2000-333448 (Tokukai 2000-333448; published on Nov. 30, 2000) and Japanese Laid-Open Patent Application No. 46480/1999 (Tokukaihei 11-46480; published on Feb. 16, 1999).

FIG. 8 is an electrical diagram of a typical and conventional switching power supply 1 of the RCC type. This switching power supply 1 primarily has an arrangement in which a main switching device q is connected in series to a primary winding n1 of a transformer t so that the output of a control winding n3 of the transformer t is fed back to the main switching device q via a control circuit 2 for continuous oscillations.

A direct current obtained by rectifying a commercial alternating current by a power supply circuit (not shown) or a direct current from a battery is supplied between input terminals p1 and p2, and a DC supply voltage is outputted between a power supply line 3 on the high level side and a power supply line 4 on the low level side.

Between the power supply lines 3 and 4, a series circuit with the primary winding n1 of the transformer t and the main switching device q is connected as described above. The switching device q is realized by, for example, a bipolar transistor and a field effect transistor. In this example in FIG. 8, a field effect transistor is adopted. Also, the control circuit 2 is connected between the power supply lines 3 and 4 via a starting circuit 5.

The starting circuit 5 is composed of two stages of starting resistors r1 and r2 so that even when a short circuit occurs at a short/open test for the circuit components, a high voltage for use in the test would not be directly applied to the control circuit 2.

When power is applied, i.e. a DC supply voltage is applied to between the input terminals p1 and p2, a junction capacitor inside the main switching device q and a DC-blocking capacitor c1 starts being charged. Note that, a charging rate in this case is determined in accordance with divided voltage values of the starting resistors r1 and r2 and a starting resistor r3 inside the control circuit 2, and capacitances of the junction capacitor inside the main switching device q and the DC-blocking capacitor c1. This causes a potential at the gate of the main switching device q to start increasing. When the potential at the gate of the main switching device q reaches an ON threshold voltage, e.g. 3V or higher, the main switching device q turns on. This causes an upward voltage in FIG. 8 to be applied to the primary winding n1, storing excited energy.

In the control winding n3 of the transformer t, an upward voltage in FIG. 8 is induced when the main switching device q turns on. Further, the induced voltage causes a current to be supplied via a bias resistor r4 and the DC-blocking capacitor c1 to the gate of the main switching device q. This maintains a turn-on state of the main switching device q.

Moreover, a current obtained from the upward voltage which has been induced in the control winding n3 when the main switching device q turns on is supplied via a phototransistor tr1 of a photocoupler pc in the control circuit 2 to one terminal of a capacitor c2. The other terminal of the capacitor c2 is connected to the power supply line 4 on the low level side. Therefore, the capacitor c2 is charged by the upward voltage, and the higher an output voltage on the secondary side becomes, the higher a charging current through the phototransistor tr1 becomes, and the more quickly the voltage between the terminals of the capacitor c2 increases.

The voltage between the terminals of the capacitor c2 is supplied to the base of a control transistor tr2 between the gate and source of the main switching device q. When the voltage between the terminals of the capacitor c2 reaches an ON threshold voltage, e.g. 0.6V or higher, the control transistor tr2 turns on. This causes the potential at the gate of the main switching device q to drop sharply, resulting in turn-off of the main switching device q.

Therefore, the higher the output voltage on the secondary side becomes, i.e. the lighter the load is, the more quickly the voltage between the terminals of the capacitor c2 increases, and the more quickly the main switching device q turns off. To the capacitor c2, the current that has been induced in the control wiring n3 is supplied via a resistor r5. A series circuit with the resistor r5 and the capacitor c2 is connected in parallel to the control winding n3, which makes up an overcurrent protection circuit. Even when the short circuit occurs on the secondary side, the overcurrent protection circuit limits a turn-on period of the main switching device q to a predetermined length, allowing for the protection of the main switching device q.

When the main switching device q turns off, a downward voltage in FIG. 8 is induced in the control winding n3. This induced voltage causes a current flow in the series circuit with the capacitor c2 and the resistor r5, decreasing the charges stored in the capacitor c2 in preparation for a next turn-on operation of the main switching device q.

Meanwhile, right after the main switching device q turns off, the excited energy that has been stored in the transformer t starts to be outputted to a secondary winding n2, and a direct current is induced in the secondary winding n2. Then, the direct current induced in the secondary winding n2 is supplied via a diode d1 to a smoothing capacitor c3, is smoothed by the smoothing capacitor c3, and is outputted via the output power supply lines 6 and 7 from output terminals p3 and p4 to a load circuit (not shown).

Further, between the output power supply lines 6 and 7, there is a voltage detector circuit 8. The voltage detector circuit 8 is composed of a voltage-dividing resistor, a photocoupler (not shown), and other components, and a light-emitting diode of the photocoupler turns on a light with the luminance corresponding to the output voltage on the secondary side. Then, owing to this lighting, a value of the outputted voltage on the secondary side is fed back via the phototransistor tr1 to the primary control circuit 2 on the primary side.

Thus, when all the excited energy stored in the transformer t is released from the secondary winding n2, the energy stored in a parasitic capacitor c4 which is included in the primary winding n1 is released from the primary winding n1, resulting in the occurrence of electrical resonance (ringing) between the parasitic capacitance c4 and the primary winding n1.

A ringing pulse caused by the ringing is transferred to the control winding n3 that is magnetically coupled to the primary winding n1, and is supplied via the bias resistor r4 and the DC-blocking capacitor c1 to the gate of the main switching device q. The ringing pulse supplied to the gate of the main switching device q is set so as to be the ON threshold voltage or higher of the main switching device q under the steady oscillation state. This causes the main switching device q to turn on. In such a manner, the main switching device q repeats ON/OFF operation, and the switching power supply 1 goes from the initial oscillation state to the steady oscillation state.

In the above-arranged switching power supply 1 of the RCC type, the initial oscillation state of depending on the current supplied from the starting resistors r1 and r2 exits for a predetermined time period at the start of the switching power supply 1. Thereafter, the switching power supply 1 goes from the initial oscillation state to the steady oscillation state on its own.

However, depending on the DC supply voltage and the state of load at the start, there might occur a poor starting that the switching power supply 1 is stabilized without going from the initial oscillation state to the steady oscillation state.

Especially, when the switching power supply 1 starts with a low DC supply voltage or a heavy load, the output voltage on the secondary side does not reach a targeted value. Therefore, a peak value of the ringing pulse becomes below the ON threshold voltage (the ringing pulse does not reach the ON threshold voltage), and the main switching device q does not turn on until the voltage obtained in the starting resistors r1 and r2 becomes the ON threshold voltage or higher again, and the switching power supply 1 becomes stable in this state, causing a poor starting. Details of this will be described with reference to FIGS. 9 through 11.

FIG. 9 is a view showing waveforms for the circuit components under the initial oscillation state, and FIG. 10 is a schematic view of the waveforms in FIG. 9. Vds represents a drain voltage waveform of the main switching device q where the source is connected to GND potential. Is represents a waveform of a current released from the secondary winding n2. Vgs represents a gate voltage waveform of the main switching device q.

FIG. 11 is an enlarged view of the gate voltage waveform for the main switching device q under the initial oscillation state. At the end of a period in which a current is released from the secondary winding n2, which is indicated by the reference mark w1, the ringing pulse which occurs between the parasitic capacitor c4 and the primary winding n1 appears in the control winding n3 that is magnetically coupled to the primary winding n1. The ringing pulse corresponds to the peak indicated by the reference mark a.

The period indicated by the reference mark w2 is a period in which the junction capacitor inside the main switching device q and the capacitor c1 are charged by the current supplied from the starting resistors r1 and r2, and the potential at the gate of the main switching device q increases moderately. A peak in the period indicated by the reference mark w3 is a state in which owing to the potential at the gate of the main switching device q being ON threshold voltage or higher, the main switching device q turns on, thereby causing a current flow in the primary winding n1, resulting in the upward voltage in FIG. 8 induced in the control winding n3. The voltage induced in the control winding n3 is supplied to the gate of the main switching device q via the bias resistor r4 and the DC-blocking capacitor c1. This maintains the turn-on state of the main switching device q.

The peak value of the ringing pulse indicated by the reference mark a is lower than the ON threshold voltage of the main switching device q indicated by the reference mark Vth because the output voltage on the secondary side does not reach a targeted value in the early stage of the power start-up. Therefore, the ringing pulse does not cause the turn-on of the main switching device q. Here, the period indicated by the reference mark w2 is needed to charge the junction capacitor inside the main switching device q and the capacitor c1 by the current supplied from the starting resistors r1 and r2 to further increase the potential at the gate of the main switching device q and to make the peak value of the ringing pulse indicated by the reference mark a reach the ON threshold voltage or higher.

After the lapse of the period indicated by the reference mark w2, the peak value of the ringing pulse gradually increases with the increase of the output voltage on the secondary side and finally becomes the ON threshold voltage Vth or higher. At this point, the main switching device q turns on only with the ringing pulse, without the help of the current from the starting resistors r1 and r2, and the switching power supply 1 goes into the steady oscillation state. However, in the case of the aforementioned low DC supply voltage and heavy load, the output voltage on the secondary side does not reach a targeted value, and the peak value of the ringing pulse indicated by the reference mark a becomes stable without reaching the ON threshold voltage Vth, resulting in a poor starting of the switching power supply 1.

In order to improve such a poor starting, there is a technique of setting low resistance of the starting resistors r1 and r2 to increase the current supplied from the starting resistors r1 and r2. This shortens a stand-by period before the potential at the gate of the main switching device q reaches the ON threshold voltage Vth (i.e. the period indicated by the reference mark w2) and relatively increases the number of times ON/OFF operation is performed per unit of time, thereby facilitating the output voltage on the secondary side reaching a targeted value.

However, a low resistance of the starting resistors r1 and r2 results in the problem of increasing power consumed in the starting resistors r1 and r2 and of significantly decreasing conversion efficiency especially under light load.

SUMMARY OF THE INVENTION

An object of the present invention is to provide a switching power supply of the ringing choke converter type which realizes an improvement in starting characteristic and allows for lower power consumption.

A switching power supply of the present invention is a switching power supply of the ringing choke converter type in which, holding means for holding a starting voltage obtained from a starting circuit are provided in relation to the starting circuit.

According to the above-arranged switching power supply of the ringing choke converter, it stores excited energy inside a transformer during a turn-on period of a main switching device. Then, it charges a capacitor by a current obtained from a voltage induced in a control winding of the transformer and a feedback current supplied from the secondary side. When a charged voltage reaches a predetermined voltage, a control switching device turns off a control terminal of the main switching device. During the turn-off period, the excited energy stored inside the transformer is outputted to the secondary side. After all the excited energy is outputted, a ringing pulse which generates in a control winding of the transformer is fed back to the control terminal of the main switching device to turn ON the main switching device again, thereby carrying out steady oscillation.

The switching power supply of such an arrangement is provided with the starting circuit for starting switching operation by supplying a DC (Direct Current) supply voltage to the control terminal of the main switching device at power-on and turning ON the main switching device when the potential at the control terminal becomes an ON threshold voltage or higher. Here, in the present invention, a holding circuit for holding a starting voltage obtained from the starting circuit is provided in relation to the starting circuit.

Conventionally, when the switching power supply starts especially with a low DC supply voltage or a heavy load, the output voltage on the secondary side does not reach a targeted value. Therefore, a peak value of the ringing pulse becomes below the ON threshold voltage (the ringing pulse does not reach the ON threshold voltage), and the main switching device does not turn on until the voltage obtained in the starting circuit becomes the ON threshold voltage or higher again, which causes a poor starting. On the contrary, in the present invention, holding the once increased starting voltage in the holding circuit allows the potential at the control terminal of the main switching device to be increased immediately from a turn-off of the control switching device. This allows the main switching device to repeat a turn-on operation, resulting in a smooth transition to the steady oscillation state.

Thus, the current for the control terminal of the main switching device is supplied not only from the starting circuit, but also from the holding circuit to continue oscillations, so that it is possible to readily start the switching power supply even under the condition of a low supply voltage and a heavy load. This makes it possible to improve the starting characteristic of the switching power supply.

In the case where the potential at the control terminal of the main switching device, which falls to almost GND potential during the turn-off period of the main switching device, is boosted only by the current from the starting circuit, the resistance of the starting circuit becomes low, resulting in a high power consumption of the starting circuit. However, the holding circuit holds the once increased starting voltage, so that the resistance of the starting circuit increases, thereby allowing for lower power consumption and suppression of a short-circuit current on the occurrence of a short circuit on the secondary side.

A switching power supply of the present invention is a switching power supply of the ringing choke converter type which causes an output voltage to reach a targeted value by an ON/OFF operation of a main switching device, and the switching power supply is provided with a holding circuit for holding a starting voltage obtained from a starting circuit and, after a turn-off of the main switching device, supplying a current to the main switching device so that the main switching device turns ON.

According to the above arrangement, the starting voltage obtained in the starting circuit which supplies a starting voltage to the main switching device is held in the holding circuit. The holding circuit, after the turn-off of the main switching device, supplies a current to the main switching device so that the main switching device turns on. This makes it possible to supply a current necessary to turn on the main switching device again not only from the starting circuit but also from the holding circuit after the turn-off of the control switching device. Therefore, the potential at the control terminal of the main switching device can be increased immediately from turn-off of the control switching device. Then, by turning on the main switching device repeatedly, it is possible to realize a smooth and immediate transition to the steady oscillation state.

For a fuller understanding of the nature and advantages of the invention, reference should be made to the ensuing detailed description taken in conjunction with the accompanying drawings.

DESCRIPTION OF THE EMBODIMENTS

The following will describe one embodiment of the present invention with reference to FIGS. 1 through 4.

Figure 1:
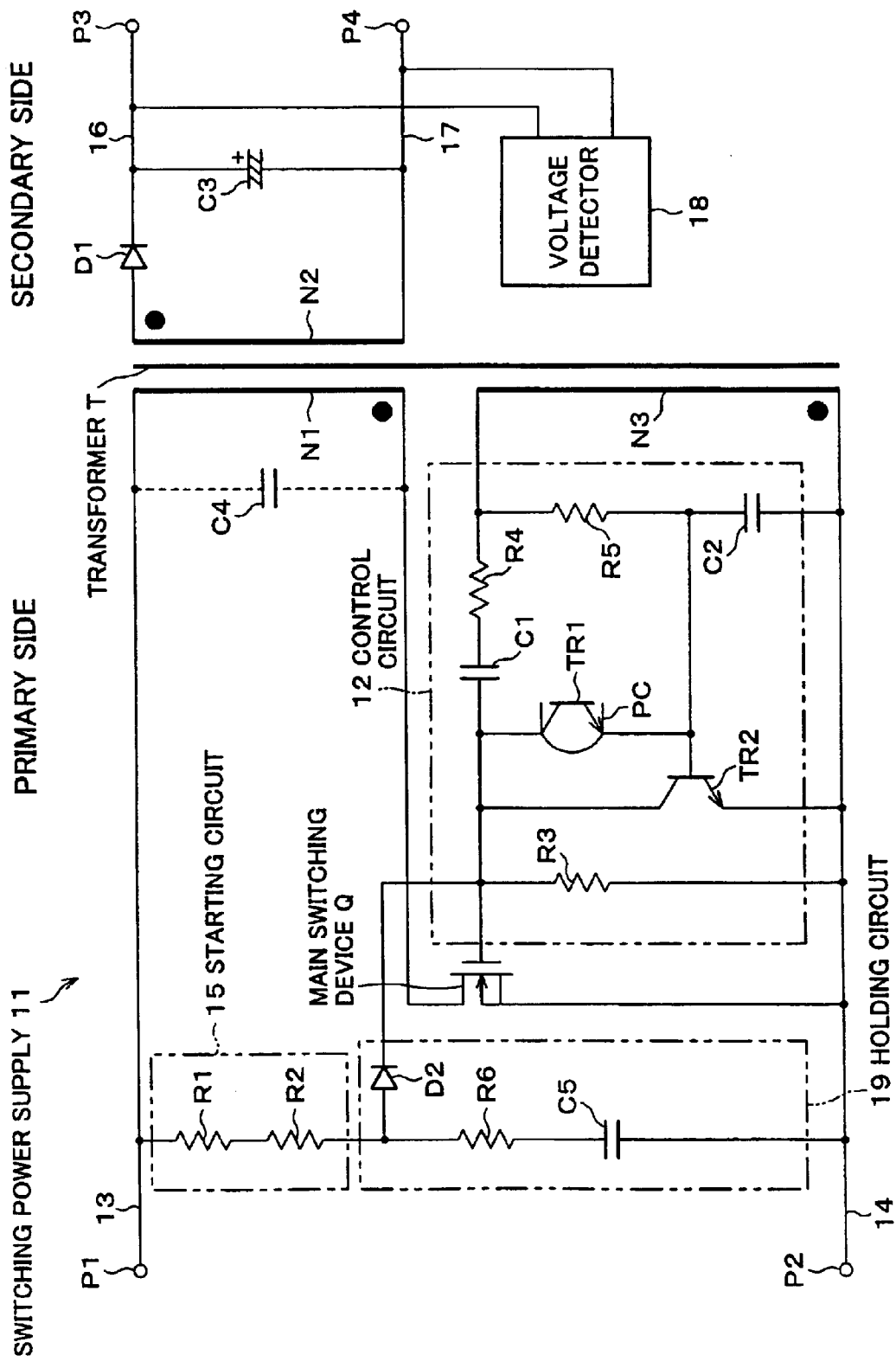
FIG. 1 is an electrical diagram of a switching power supply according to one embodiment of the present invention.

FIG. 1 is an electrical diagram of a switching power supply 11 according to one embodiment of the present invention. This switching power supply 11 primarily has an arrangement in which a main switching device Q is connected in series to a primary winding N1 of a transformer T so that the output of a control winding N3 of the transformer T returns to the main switching device Q via a control circuit 12 for continuous oscillations.

A direct current obtained by rectifying a commercial alternating current by a power supply circuit (not shown) or a direct current from a battery is supplied between input terminals P1 and P2, and a DC supply voltage is outputted between a power supply line 13 on the high level side and a power supply line 14 on the low level side. Between the power supply lines 13 and 14, a series circuit with the primary winding N1 of the transformer T and the main switching device Q are connected, as described above.

The main switching device Q is realized by, for example, a bipolar transistor and a field effect transistor. In this example in FIG. 1, a field effect transistor is adopted. Also, the control circuit 12 is connected between the power supply lines 13 and 14 via a starting circuit 15.

The starting circuit 15 is composed of two stages of starting resistors R1 and R2 so that even when a short circuit occurs at a short/open test for the circuit components, a high voltage for use in the test would not be directly applied to the control circuit 12.

When power is applied, i.e. a DC supply voltage is applied to between the input terminals P1 and P2, a junction capacitor inside the main switching device Q and a DC-blocking capacitor C1 starts being charged. Note that, a charging rate in this case is determined in accordance with divided voltage values of the starting resistors R1 and R2 and a starting resistor R3 inside the control circuit 12, and capacitances of the junction capacitor inside the main switching device Q and the DC-blocking capacitor C1. This causes a potential at the gate of the main switching device Q to start increasing. When the potential at the gate of the main switching device Q reaches an ON threshold voltage, e.g. 3V or higher, the main switching device Q turns on. This causes an upward voltage in FIG. 1 to be applied to the primary winding N1, storing excited energy.

In the control winding N3 of the transformer T, an upward voltage in FIG. 1 is induced when the main switching device Q turns on. The induced voltage causes a current to be supplied via a bias resistor R4 and the DC-blocking capacitor C1 from the control winding N3 to the gate of the main switching device Q. This maintains a turn-on state of the main switching device Q.

Moreover, a current obtained from the upward voltage which has been induced in the control winding N3 when the main switching device Q turns on is supplied via a phototransistor TR1 of a photocoupler PC in the control circuit 12 to one terminal of a capacitor C2 (control capacitor). The other terminal of the capacitor C2 is connected to the power supply line 14 on the low level side. Therefore, the capacitor C2 is charged by the positive upward voltage described above, and the higher an output voltage on the secondary side becomes, the higher a charging current through the phototransistor TR1 becomes, and the more quickly the voltage between the terminals of the capacitor C2 increases.

Further, the voltage between the terminals of the capacitor C2 is supplied to the base of a control transistor TR2 (control switching device) between the gate and source of the main switching device Q. Here, when the voltage between the terminals of the capacitor C2 reaches an ON threshold voltage, e.g. 0.6V or higher, the control transistor TR2 turns on. This causes the potential at the gate of the main switching device Q to drop sharply, resulting in turn-off of the main switching device Q.

Therefore, the higher the output voltage on the secondary side becomes, i.e. the lighter the load is, the more quickly the voltage between the terminals of the capacitor C2 increases, and the more quickly the main switching device Q turns off.

To the capacitor C2, the current that has been induced in the control wiring N3 is supplied via a resistor R5. A series circuit with the resistor R5 and the capacitor C2 is connected in parallel to the control winding N3, which makes up an overcurrent protection circuit. Even when the short circuit occurs on the secondary side, the overcurrent protection circuit limits a turn-on period of the main switching device Q to a predetermined length, allowing for the protection of the main switching device Q.

When the main switching device Q turns off, a downward voltage in FIG. 1 is induced in the control winding N3. This induced voltage causes a current flow in the series circuit with the capacitor C2 and the resistor R5, decreasing the charges stored in the capacitor C2 in preparation for a next turn-on operation of the main switching device Q.

Meanwhile, right after the main switching device Q turns off, the excited energy that has been stored in the transformer T starts to be outputted to a secondary winding N2, and a direct current is induced in the secondary winding N2. Then, the direct current induced in the secondary winding N2 is supplied via a diode D1 to a smoothing capacitor C3, is smoothed by the smoothing capacitor C3, and is outputted via the output power supply lines 16 and 17 from output terminals P3 and P4 to a load circuit (not shown).

Further, between the output power supply lines 16 and 17, there is a voltage detector circuit 18. The voltage detector circuit 18 is composed of a voltage-dividing resistor, a photocoupler (not shown), and other components, and a light-emitting diode of the photocoupler turns on a light with the luminance corresponding to the output voltage on the secondary side. Then, owing to this lighting, a value of the output voltage on the secondary side is fed back via the phototransistor TR1 to the primary control circuit 12 on the primary side.

Thus, when all the excited energy stored in the transformer T is released from the secondary winding N2, the energy stored in a parasitic capacitance C4 which is included in the primary winding N1 is released from the primary winding N1, resulting in the occurrence of electrical resonance (ringing) between the parasitic capacitance C4 and the primary winding N1. A ringing pulse caused by the electrical resonance is transferred to the control winding N3 that is magnetically coupled to the primary winding N1, and is supplied via the bias resistor R4 and the DC-blocking capacitor C1 to the gate of the main switching device Q. The ringing pulse supplied to the gate of the main switching device Q is set so as to be the ON threshold voltage or higher of the main switching device Q under the steady oscillation state. This causes the main switching device Q to turn on.

In such a manner, the main switching device Q repeats ON/OFF operation, and the switching power supply 11 goes from the initial oscillation state to the steady oscillation state.

Note that, in the switching power supply 11, a holding circuit 19 for holding a starting voltage obtained from the starting circuit 15 is provided in relation to the starting circuit 15. The holding circuit 19 includes a starting capacitor C5, a current-limiting resistor R6, and a back-current preventing diode D2.

The starting capacitor C5 is a storage capacitor which is charged by the current from the starting circuit 15. The current-limiting resistor R6, which is a resistor for limiting a charging current and a discharging current of the starting capacitor C5, is connected between the starting capacitor C5 and the starting circuit 15.

The back-current preventing diode D2 is one that draws the charged voltage of the starting capacitor C5 from a connection point between the current-limiting resistor R6 and the starting circuit 15 to supply it to the gate of the main switching device Q. Note that, in the back-current preventing diode D2, an anode is connected to the connection point, and a cathode is connected to the gate of the main switching device Q.

A time constant of the starting capacitor C5 and the current-limiting resistor R6 is set to be a sufficiently large value such that there is no variation in the charged voltage of the starting capacitor C5 in the unit of time for the switching cycle.

For example, a switching frequency under the steady oscillation state is 55 kHz, and the switching cycle of 18.2 $\mu$sec is obtained. On the contrary, the capacitance of the starting capacitor C5 is 1 $\mu$F, and the resistance of the current-limiting resistor R6 is 2.2 k$\Omega$, whereby a time constant of 2200 $\mu$sec is obtained. This is about a hundred-fold the above switching cycle.

Therefore, when the power is applied, the current supplied from the starting resistors R1 and R2 is charged in the junction capacitor of the main switching device Q and the DC-blocking capacitor C1 and is charged in the starting capacitor C5 inside the holding circuit 19. Then, when the main switching device Q turns off from the turn-on state, the potential at the gate of the switching element Q drops, and the charges stored in the starting capacitor C5 are discharged from the current-limiting resistor R6 via the back-current preventing diode D2. However, as described above, since the time constant of the starting capacitor C5 and the current-limiting resistor R6 is set to be sufficiently greater with respect to the switching cycle, the variation in the amount of electric charges charged in the starting capacitor C5 is smaller than that of the arrangement in FIG. 8. Especially in the unit of time for the switching cycle, the charged voltage of the starting capacitor C5 hardly varies.

Figure 8:
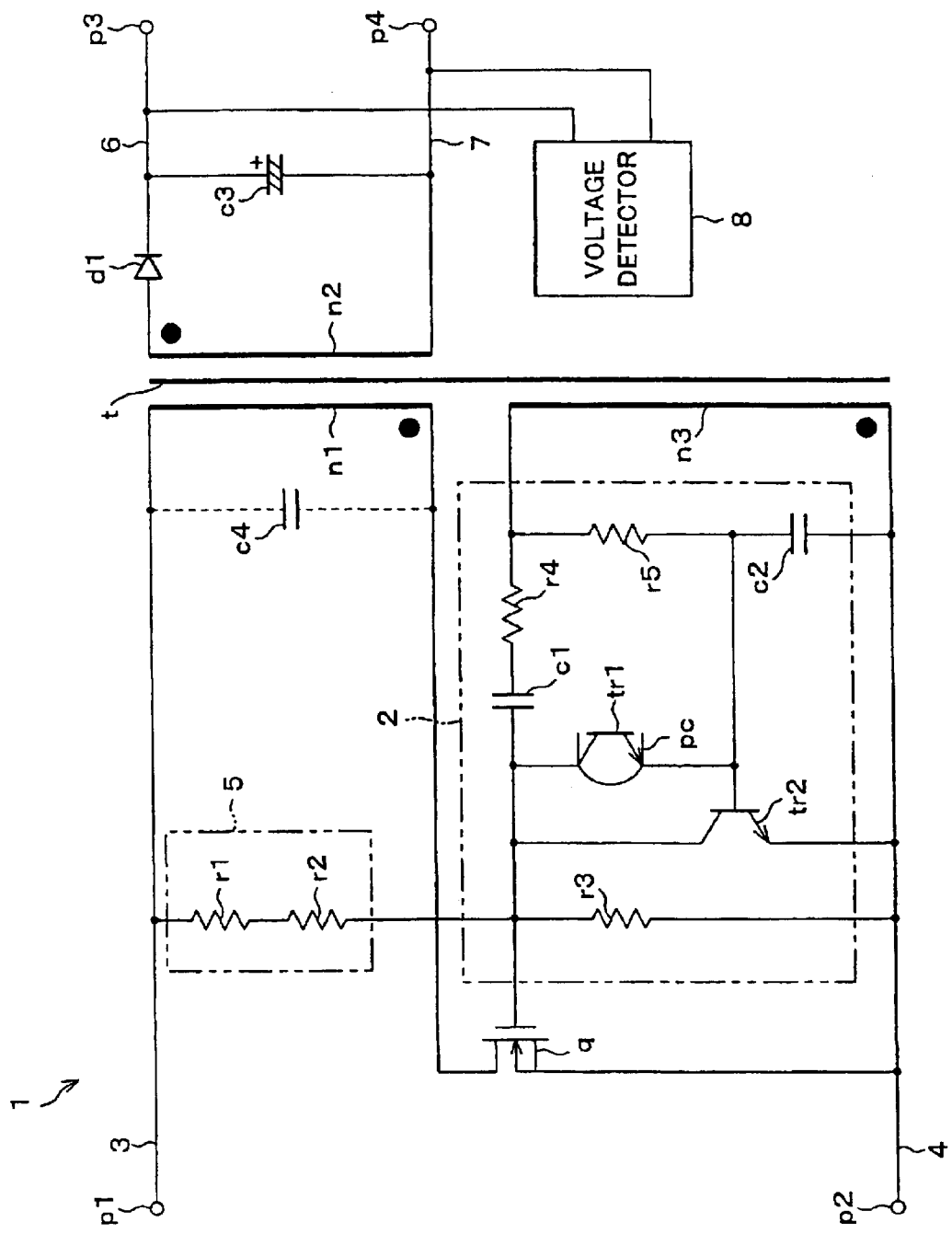
FIG. 8 is an electrical diagram of a typical and conventional switching power supply of the RCC type.
Figure 10:
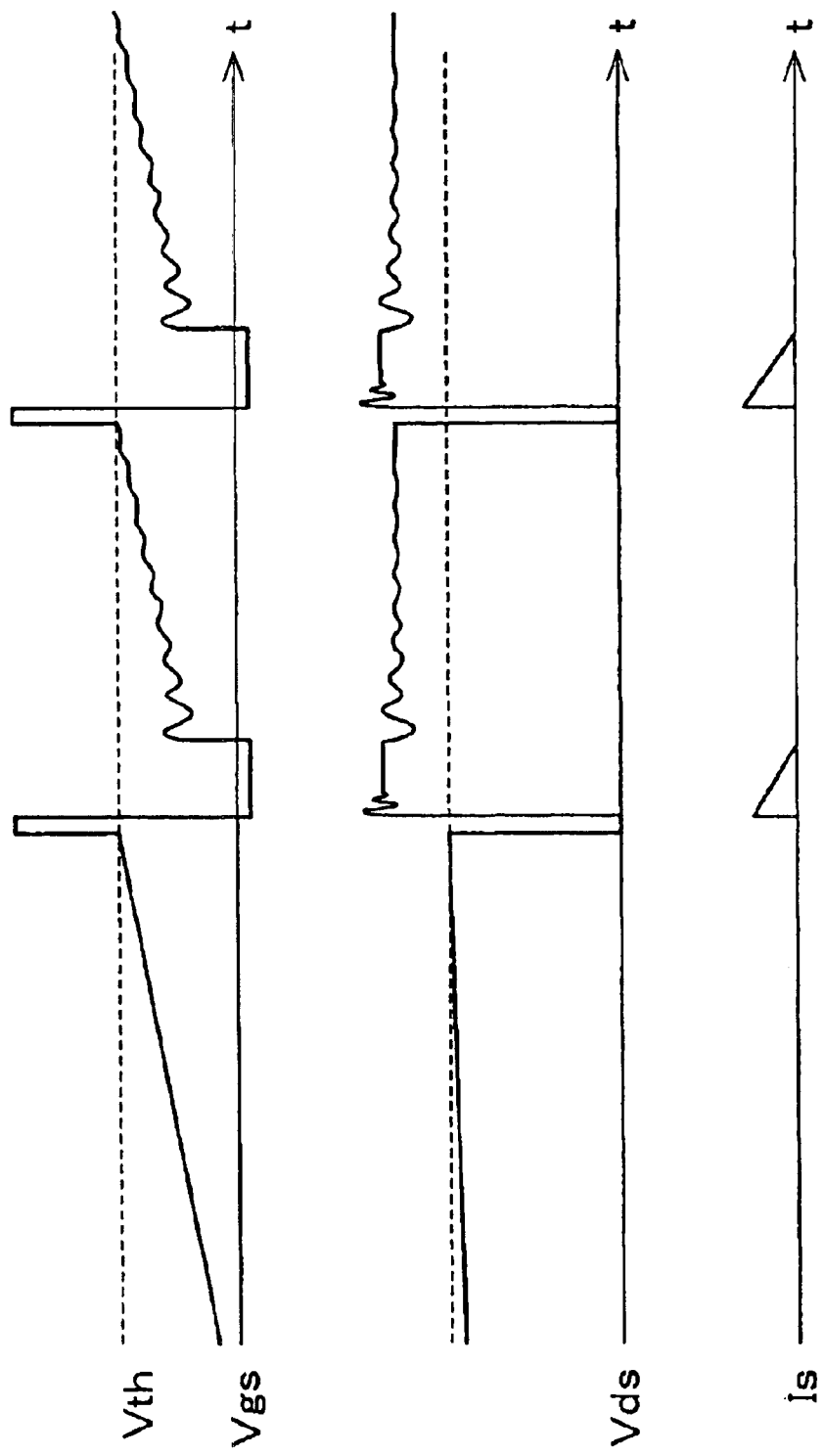
FIG. 10 is a graph showing current waveforms for the circuit components under the initial oscillation state in the switching power supply of FIG. 8.
Figure 11:
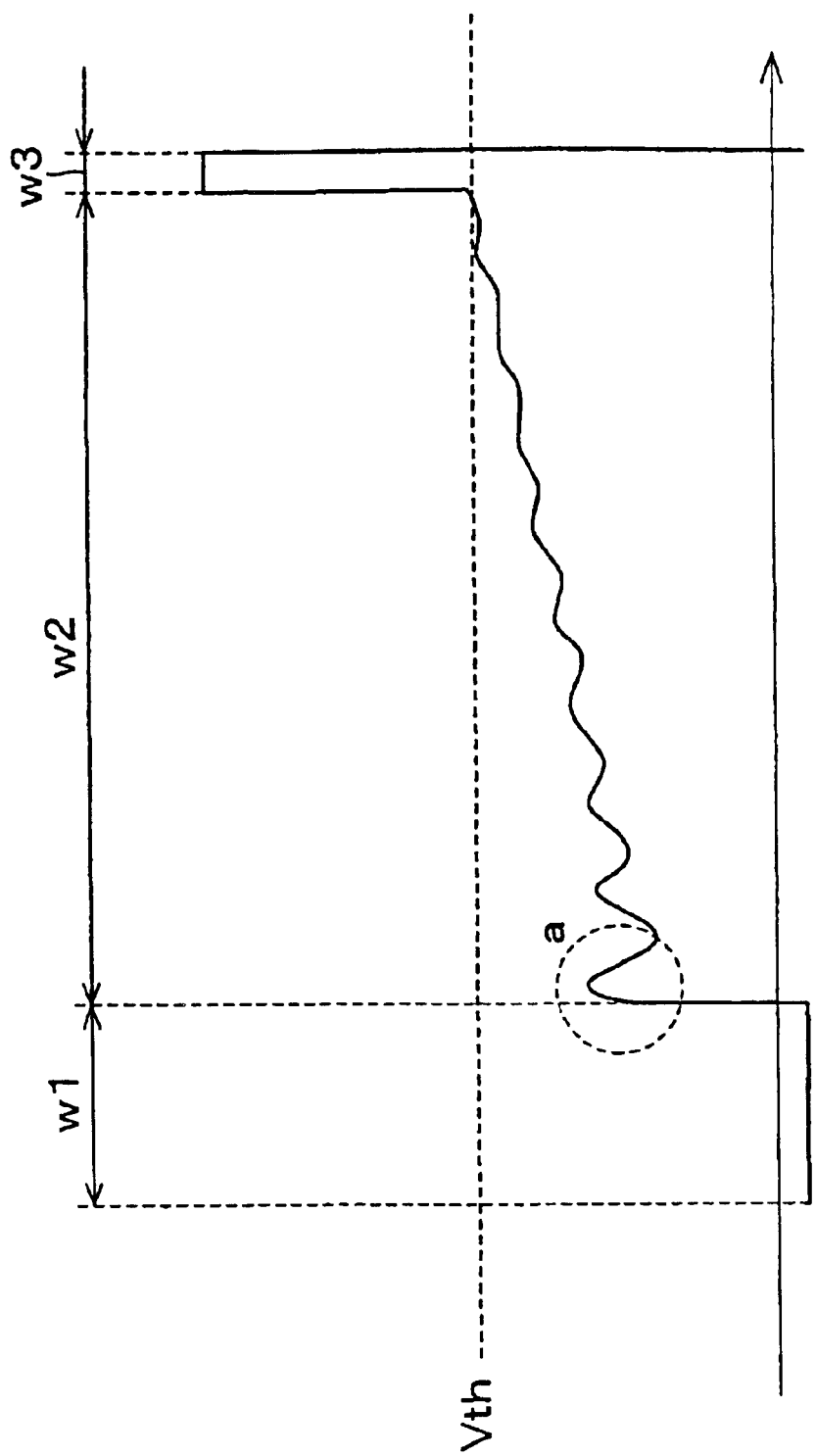
FIG. 11 is an enlarged view of a gate voltage waveform for a main switching device under the initial oscillation state in the switching power supply of FIG. 8.

Therefore, in the case of a conventional art without the holding circuit 19 as shown in FIG. 8, as indicated by Vgs in FIG. 10, in the next oscillating operation, the charging to the gate of the main switching device Q is performed only with the current supplied via the starting resistors r1 and r2. This results in a long charging period, as indicated by the reference mark w2 in FIG. 11.

Figure 2:
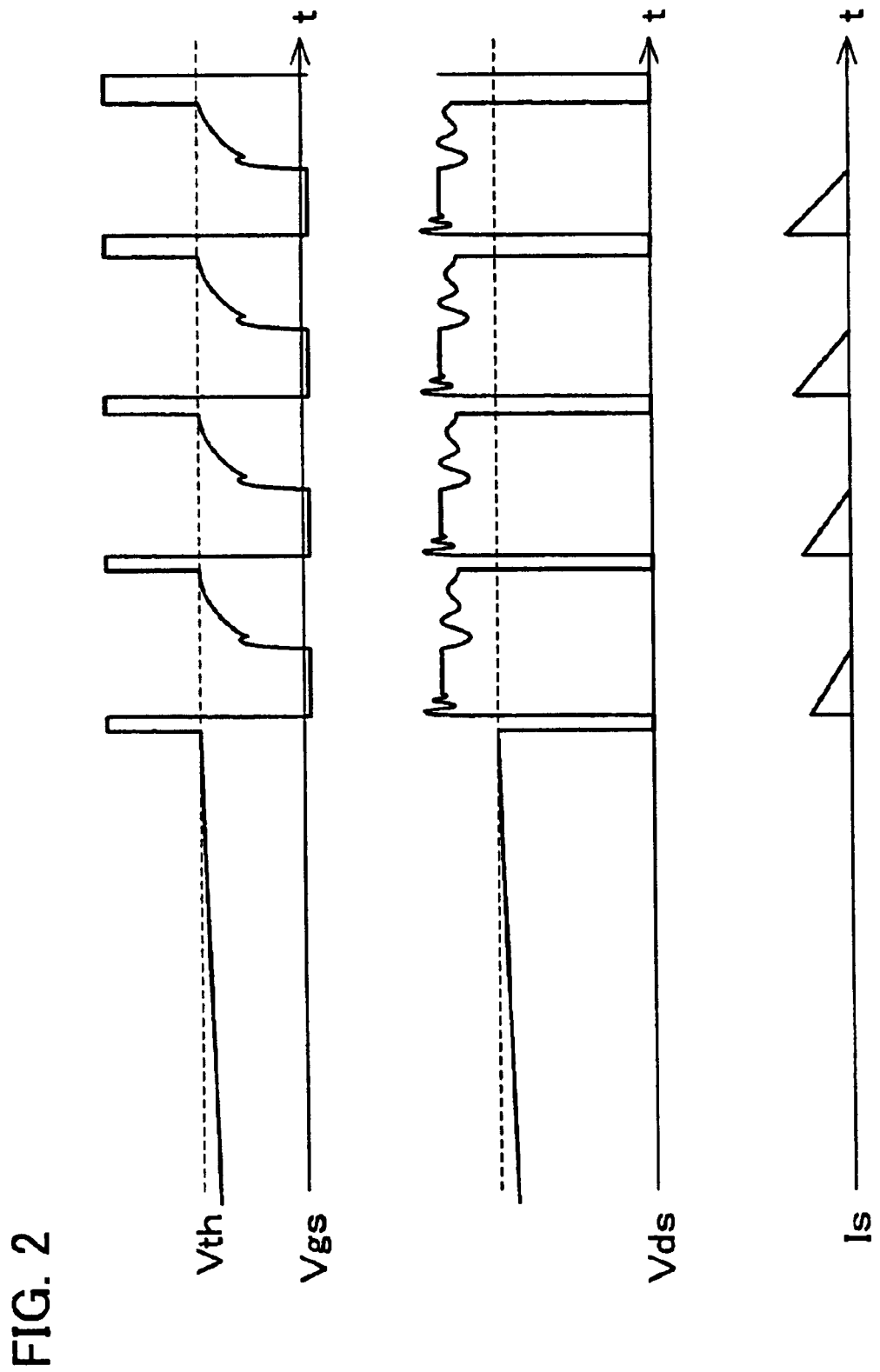
FIG. 2 is a graph showing current waveforms for the circuit components under the initial oscillation state in the switching power supply of FIG. 1.

On the contrary, according to the arrangement of the present embodiment in which the holding circuit 19 is added, as indicated by Vgs in FIG. 2, the charging to the gate of the main switching device Q is performed not only with the current supplied from the starting resistors R1 and R2 but also with the current from the starting capacitor C5. The current from the starting capacitor C5 is a current that is generated by carrying over the electric charge that has been charged in the starting capacitor C5 at the previous time. This increases the potential at the gate of the main switching device Q right after the release of the current from the secondary winding N2 in the transformer T is completed.

The potential at the gate of the main switching device Q increases quickly and reaches the next ON threshold voltage Vth earlier, as compared to the conventional art. In this manner, a turn-off period of the main switching device Q becomes shorter under the initial oscillation state, which allows the output voltage on the secondary side to reach a targeted value earlier than the conventional art.

Figure 3:
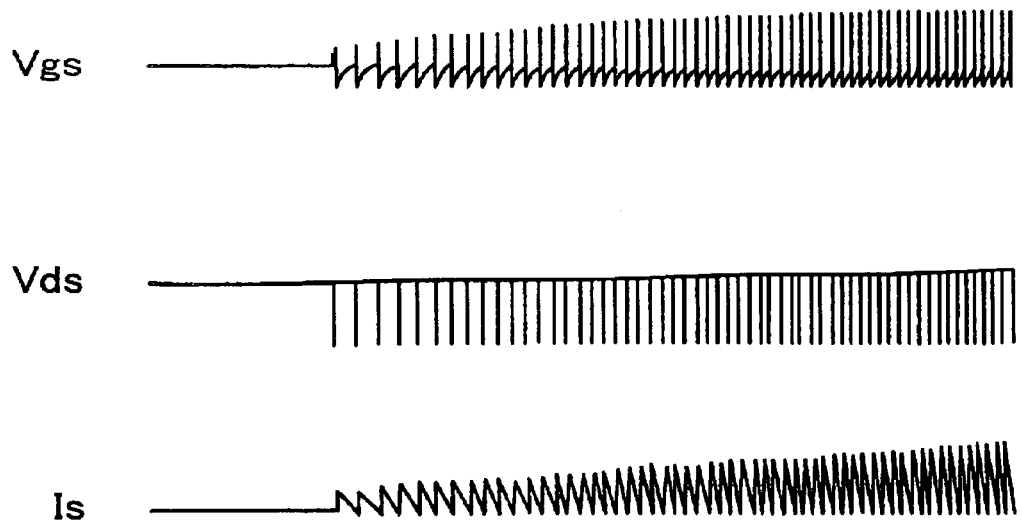
FIG. 3 is a view showing current waveforms for the circuit components under the initial oscillation state in the switching power supply of FIG. 1.
Figure 9:
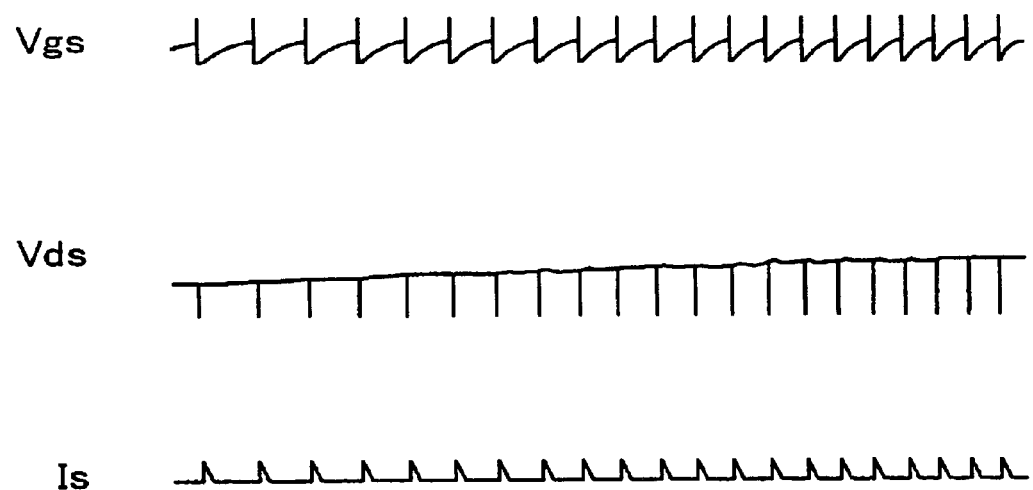
FIG. 9 is a view showing current waveforms for the circuit components under the initial oscillation state in the switching power supply of FIG. 1.

FIG. 3 shows waveforms for the circuit components under the initial oscillation state. As compared to the conventional waveform shown in FIG. 9, although the waveform in FIG. 3 is equal in length of the horizontal axis that is a time base in these drawings, the number of times switching is performed per unit of time in FIG. 3 is dramatically greater. This is because the turn-off period of the main switching device Q in the present embodiment is shortened more than that of the conventional art. As a result of this, it is apparent that the slope of an oblique line of the triangular waveform for the current released from the secondary winding N2, which is indicated by the reference mark Is, becomes steeper at an earlier stage than that of the conventional art.

Figure 4:
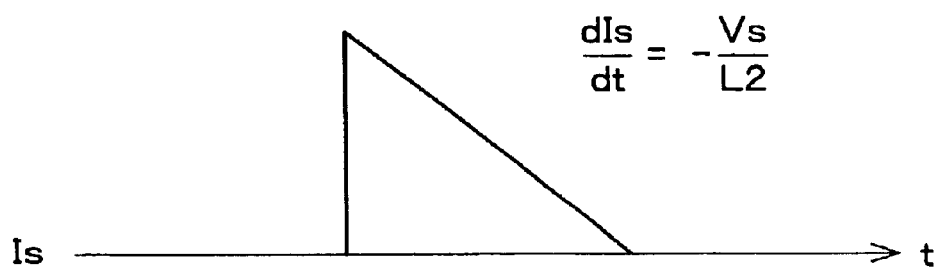
FIG. 4 is a schematic view of a current waveform on the secondary side in a transformer of a switching power supply of the RCC type.

Here, as shown in FIG. 4, in the switching power supply of the RCC system, the amount of tilt in the oblique line of the triangular waveform for the current Is supplied from the secondary winding N2 is generally proportional to a voltage Vs appearing in the secondary winding N2 during the flyback period. Therefore, it can be said that an early steep slope of the triangular waveform, as described above, means that the voltage Vs in the secondary winding N2 reaches a targeted value earlier in the present embodiment, as compared to the conventional art.

As described above, the holding circuit 19 holds the once increased starting voltage, so that the potential at the gate of the main switching device Q can increase immediately from a turn-off of the control transistor TR2. This allows the main switching device Q to turn on repeatedly, resulting in a smooth transition to the steady oscillation state. Thus, the current for the gate of the main switching device Q is supplied not only from the starting resistors R1 and R2, but also from the holding circuit 19 to continue oscillations, so that it is possible to readily start the switching power supply 11 even under the condition of a low supply voltage and a heavy load. This makes it possible to improve the starting characteristic of the switching power supply 11.

Further, in the case where the potential at the gate of the main switching device Q, which falls to almost GND potential during the turn-off period of the main switching device Q, is boosted only by the current from the starting resistors R1 and R2, the resistance of the starting resistor R1 and R2 must be low. In this case, a power consumption of the starting resistors R1 and R2 increases. However, as with the present embodiment, the holding circuit 19 holds the once increased starting voltage, so that the resistance of the starting resistors R1 and R2 increases, thereby allowing for lower power consumption and suppression of a short-circuit current on the occurrence of a short circuit on the secondary side.

Still further, the holding circuit 19, which is composed of the starting capacitor C5, the current-limiting resistor R6, and the back-current preventing diode D2, can be realized only by additionally connecting a small number of components to the conventional starting circuit 15.

Note that, according to the switching power supply disclosed in Japanese Laid-Open Patent Application No. 46480/1999, a circuit for connecting and disconnecting a starting circuit is an essential component. However, the switching power supply 11 of the present embodiment eliminates the need for the circuit for connecting and disconnecting a starting circuit. Therefore, the switching power supply 11 of the present embodiment has a cost advantage over the switching power supply disclosed in Japanese Laid-Open Patent Application No. 46480/1999 because the former can reduce the number of circuit components.

Further, according to the switching power supply disclosed in Japanese Laid-Open Patent Application No. 2000-333448, a circuit for obtaining a starting current from a primary winding is an essential component. However, the switching power supply 11 of the present embodiment eliminates the need for the circuit for obtaining a starting current from a primary winding. Therefore, the switching power supply 11 of the present embodiment has a cost advantage over the switching power supply disclosed in Japanese Laid-Open Patent Application No. 2000-333448 because the former can reduce the number of circuit components.

Moreover, according to the switching power supply disclosed in Japanese Laid-Open Patent Application No. 2000-333448, it is necessary to provide a rectifying and smoothing circuit which might be a new noise source. However, the switching power supply 11 of the present embodiment eliminates the need for the rectifying and smoothing circuit.

Figure 5:
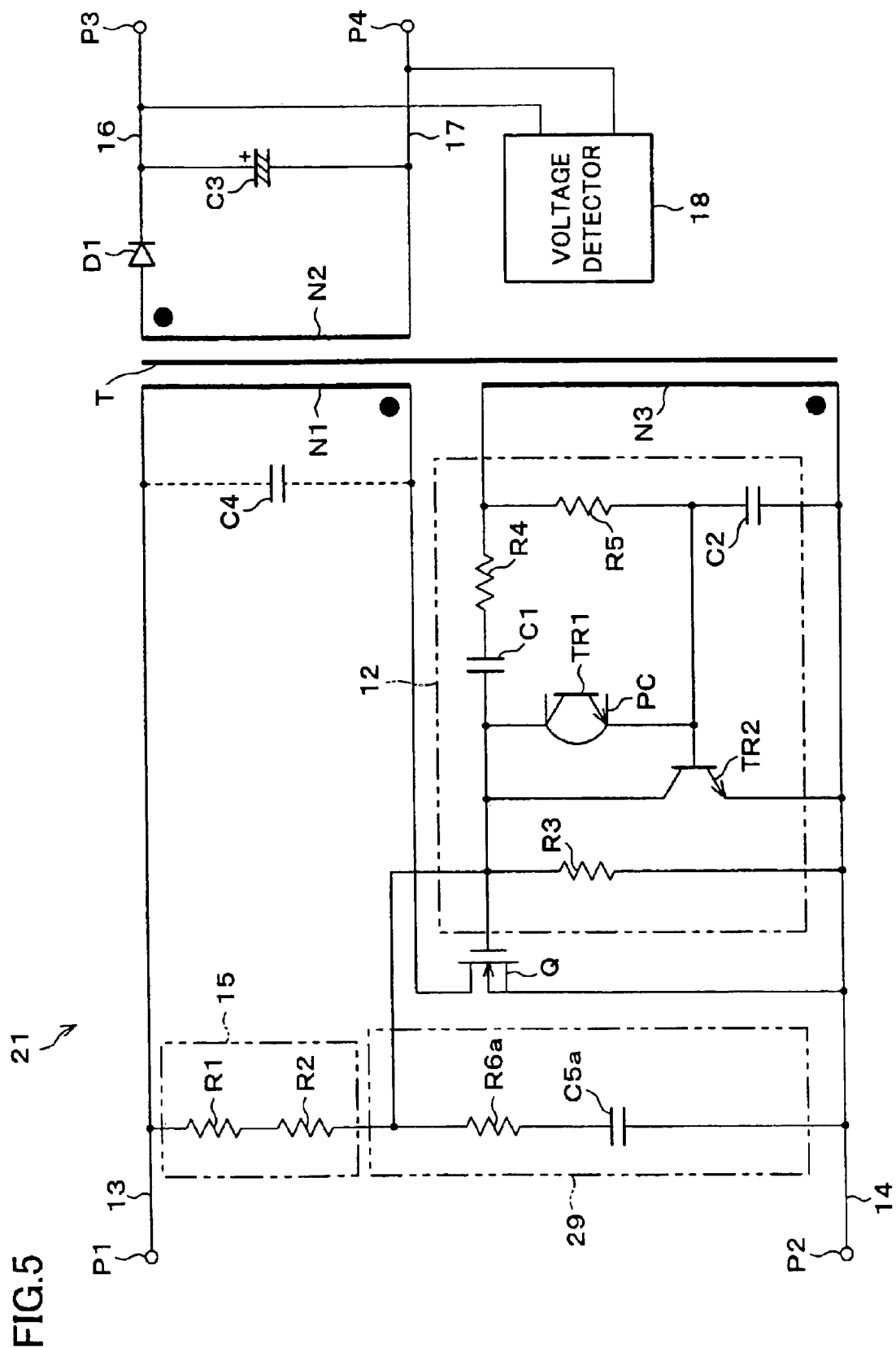
FIG. 5 is an electrical diagram of a switching power supply according to another embodiment of the present invention.
Figure 6:
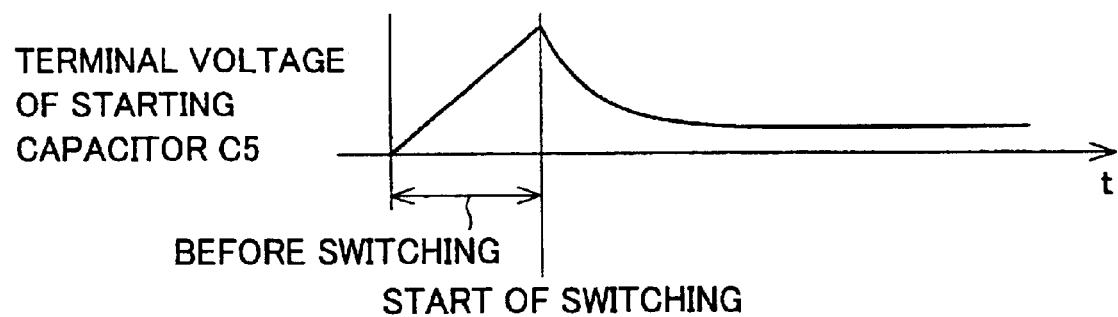
FIG. 6 is a graph showing variation in terminal voltage of a starting capacitor with respect to an elapsed time in the switching power supply of FIG. 1.
Figure 7:
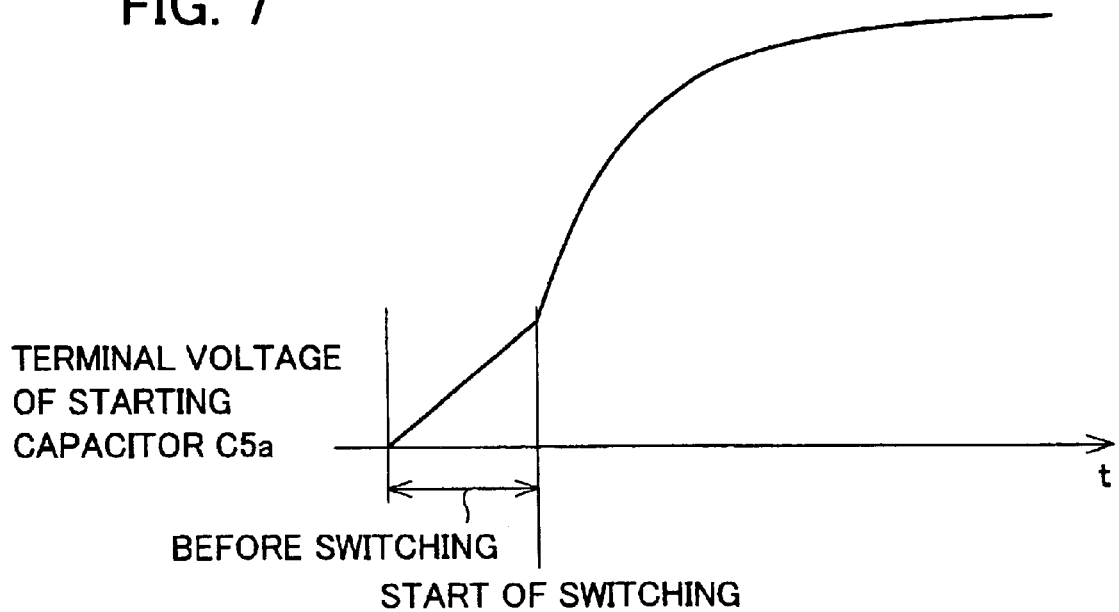
FIG. 7 is a graph showing variation in terminal voltage of a starting capacitor with respect to an elapsed time in the switching power supply of FIG. 5.

The following will describe another embodiment according to the present invention with reference to FIG. 5 through FIG. 7.

FIG. 5 is an electrical diagram of a switching power supply 21 according to another embodiment of the present invention. The switching power supply 21 is similar to the aforementioned switching power supply 11. Therefore, the corresponding parts are given the same reference numerals and explanations thereof are omitted here.

In the switching power supply 21, a holding circuit 29 for holding a starting voltage includes a starting capacitor C5a which is charged by the current from the starting circuit 15 and a current-limiting resistor R6a for limiting a charging current and a discharging current of the starting capacitor C5a. Further, the switching power supply 21 is arranged such that the charged voltage of the starting capacitor C5a is directly supplied to the gate of the main switching device Q from the connection point between the current-limiting resistor R6a and the starting circuit 15, and the starting capacitor C5a is charged by the current obtained from the voltage induced in the control winding N3 of the transformer T during the turn-on period of the main switching device Q.

Specifically, the current-limiting resistor R6a is connected between the starting capacitor C5a and the starting circuit 15. That is, the starting circuit 15, the current-limiting resistor R6a, and the starting capacitor C5a are connected in series. Further, the connection point between the current-limiting resistor R6a and the starting capacitor C5a is connected to the gate of the main switching device Q.

Here, a series circuit with the current-limiting resistor R6a and the starting capacitor C5a is short-circuited by the control transistor TR2 when the main switching device Q turns off. However, the starting capacitor C5a has been charged by the current obtained from the voltage induced in the control wiring N3 during the turn-on period of the main switching device Q, so that if the resistance of the current-limiting resistor R6a is high on some level, the turn-on of the main switching device Q can be repeated until the oscillation state goes into the steady oscillation state.

FIG. 6 illustrates a graph showing a terminal voltage of the starting capacitor C5 of the switching power supply 11 shown in FIG. 1, and FIG. 7 illustrates a graph showing a terminal voltage of the starting capacitor C5a of the switching power supply 21.

Before the start of switching, both of the terminal voltages of the starting capacitors C5 and C5a increase. Upon switching, the electric charges of the starting capacitors C5 and C5a flow into the gate of the main switching device Q.

Here, in the switching power supply 11, the current obtained from the voltage induced in the control winding N3 after switching is blocked by the diode D2. Therefore, in the starting capacitor C5, the terminal voltage decreases due to its spontaneous discharge. On the contrary, in the starting capacitor C5a, the amount of current charged by the voltage induced in the control winding N3 becomes larger than the amount of current flown into the gate of the main switching device Q, thereby increasing the terminal voltage as shown in FIG. 7.

Therefore, the capacitance of the starting capacitor C5a in the switching power supply 21 can be smaller than that of the starting capacitor C5 in the switching power supply 11, which is advantageous in terms of downsizing and cost reduction of a power supply. In addition, for the same reason, the resistance of the starting resistors R1 and R2 in the switching power supply 21 can be set to be higher than those in the switching power supply 11, thereby realizing lower power consumption in the starting resistors R1 and R2.

On the other hand, in the switching power supply 11, when some time passes after a start-up, the charges stored in the starting capacitor C5 get close to zero. Therefore, it is possible to suppress a short-circuit current when the output terminal is short-circuited.

In a switching power supply of the present invention, the holding circuit includes:

a starting capacitor which is charged by a current supplied from the starting circuit;

a current-limiting resistor for limiting a charging current and a discharging current of the starting capacitor; and a back-current preventing diode for drawing a charged voltage of the starting capacitor from a connection point between the current-limiting resistor and the starting circuit to supply the charged voltage to a control terminal of a main switching device, and a time constant of the starting capacitor and the current-limiting resistor is set so that the charged voltage of the starting capacitor is substantially constant in a unit of time for a switching cycle.

According to the above arrangement, a series circuit with the current-limiting resistor and the starting capacitor, which is connected to the control terminal of the main switching device, is short-circuited by the control switching device when the main switching device turns off. However, since the time constant is set to such a sufficiently large value that there is no variation in the charged voltage of the starting capacitor in the unit of time for the switching cycle, with respect to the switching cycle, the charged voltage is maintained at substantially constant voltage in the unit of time for the switching cycle. This allows the main switching device to repeat the turn-on operation until the power supply goes into the steady oscillation state.

Therefore, it is possible to concretely arrange holding means which can realize reliable starting and lower power consumption only by additionally connecting a small number of components as described above to the conventional starting circuit.

In a switching power supply of the present invention, the holding circuit includes:

a starting capacitor which is charged by a current supplied from the starting circuit; and a current-limiting resistor for limiting a charging current and a discharging current of the starting capacitor, and a charged voltage of the starting capacitor is supplied from a connection point between the current-limiting resistor and the starting circuit to a control terminal of a main switching device, so that the starting capacitor is charged by a current obtained from a voltage induced in a control winding of a transformer charges during a turn-on period of the main switching device.

According to the above arrangement, a series circuit with the current-limiting resistor and the starting capacitor, which is connected to the control terminal of the main switching device, is short-circuited by the control switching device when the main switching device turns off. However, since the starting capacitor is also charged by a current obtained from a voltage induced in a control winding of a transformer during a turn-on period of the main switching device, it is possible to repeat the turn-on operation of the main switching device until the oscillation state goes into the steady oscillation state by appropriately setting the resistance of the current-limiting resistor.

Therefore, it is possible to concretely arrange holding means which can realize a reliable starting and lower power consumption only by additionally connecting a small number of components as described above to the conventional starting circuit and to realize the starting capacitor compactly without an unduly large capacitance.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A switching power supply of the ringing choke converter type in which, a holding circuit for holding a starting voltage obtained from a starting circuit is provided in relation to the starting circuit, wherein a time constant of the holding circuit is set such that a voltage held by the holding circuit is substantially constant in a unit of time for a switching cycle.

2. The switching power supply according to claim 1, wherein:

the holding circuit includes:

a starting capacitor which is charged by a current supplied from the starting circuit;

a current-limiting resistor for limiting a charging current and a discharging current of the starting capacitor; and a back-current preventing diode for drawing a charged voltage of the starting capacitor from a connection point between the current-limiting resistor and the starting circuit to supply the charged voltage to a control terminal of a main switching device, and a time constant of the starting capacitor and the current-limiting resistor is set so that the charged voltage of the starting capacitor is substantially constant in a unit of time for a switching cycle.

3. The switching power supply according to claim 1, wherein:

the holding circuit includes:

a starting capacitor which is charged by a current supplied from the starting circuit; and a current-limiting resistor for limiting a charging current and a discharging current of the starting capacitor, and a charged voltage of the starting capacitor is supplied from a connection point between the current-limiting resistor and the starting circuit to a control terminal of a main switching device, so that the starting capacitor is charged by a current obtained from a voltage induced in a control winding of a transformer during a turn-on period of the main switching device.

4. A switching power supply of the ringing choke converter type which causes an output voltage to reach a targeted value by an ON/OFF operation of a main switching device, the switching power supply being provided with a holding circuit for holding a starting voltage obtained from a starting circuit and, after a turn-off of the main switching device, said holding circuit supplies a current to the main switching device so that the main switching device turns on, wherein a time constant of the holding circuit is set such that a voltage held by the holding circuit is substantially constant in a unit of time for a switching cycle.

5. The switching power supply according to claim 4, wherein:

the holding circuit includes:

a starting capacitor which is charged by a current supplied from the starting circuit; and a current-limiting resistor for limiting a charging current and a discharging current of the starting capacitor.

6. The switching power supply according to claim 5, wherein:

the holding circuit includes a back-current preventing diode for drawing a charged voltage of the starting capacitor from a connection point between the current-limiting resistor and the starting circuit to supply the charged voltage to a control terminal of the main switching device.

7. The switching power supply according to claim 6, wherein:

a time constant of the starting capacitor and the current-limiting resistor is set so that the charged voltage of the starting capacitor is substantially constant in a unit of time for a switching cycle.

8. The switching power supply according to claim 5, wherein:

a charged voltage of the starting capacitor is supplied from a connection point between the current-limiting resistor and the starting circuit to a control terminal of a main switching device, so that the starting capacitor is charged by a current obtained from a voltage induced in a control winding of a transformer during a turn-on period of the main switching device.

9. The switching power supply according to claim 4, wherein:

a transformer for storing excited energy when the main switching device turns on and releasing the excited energy to a secondary side when the main switching device turns off is provided.

10. The switching power supply according to claim 4, comprising:

a control capacitor which is charged when the main switching device turns on and releases a stored voltage when the main switching device turns off; and a control switching device which causes the main switching device to turn off when the stored voltage of the control capacitor reaches a predetermined voltage.

11. The switching power supply according to claim 4, wherein:

the main switching device is a bipolar transistor.

12. The switching power supply according to claim 4, wherein:

the main switching device is a field effect transistor.

* * * * *